United States Patent [19]
Nohara et al.

[11] Patent Number: 5,333,147
[45] Date of Patent: Jul. 26, 1994

[54] AUTOMATIC MONITORING OF DIGITAL COMMUNICATION CHANNEL CONDITIONS USINHG EYE PATTERNS

[75] Inventors: Timothy J. Nohara, St. Catherines; Al-Nasir Premji, Waterloo, both of Canada

[73] Assignee: Her Majesty the Queen in Right of Canada as represented by the Minister of Defence, Canada

[21] Appl. No.: 934,230

[22] Filed: Aug. 25, 1992

[30] Foreign Application Priority Data

Nov. 29, 1991 [CA] Canada .................................. 2056679

[51] Int. Cl.⁵ ............................................. H04B 17/00
[52] U.S. Cl. ........................................ 375/10; 370/13; 371/5.1
[58] Field of Search ..................... 375/10, 100; 370/13, 370/17; 371/5.1; 455/67.3

[56] References Cited

U.S. PATENT DOCUMENTS

| | | |
|---|---|---|
| 3,721,959 | 3/1973 | George. |
| 4,034,340 | 7/1977 | Sant'Agostino. |
| 4,188,615 | 2/1980 | Tan. |
| 4,367,550 | 1/1983 | Douverne ............................ 375/10 |
| 4,633,465 | 12/1986 | Fitch et al. ......................... 375/10 |
| 5,034,963 | 7/1991 | Singer ................................ 375/10 |
| 5,144,643 | 9/1992 | Thomas et al. ..................... 375/10 |

OTHER PUBLICATIONS

Nishimoto et al., "New Method for Analyzing Eye Patterns . . . ", May, 1988, pp. 678–685.
Okiyama et al., "Evaluation of 4–6Bit/s Optical Fiber Transmission Distance . . . ", Nov. 1988, pp. 1686–1692.

*Primary Examiner*—Stephen Chin
*Assistant Examiner*—Timothy J. May
*Attorney, Agent, or Firm*—Nixon & Vanderhye

[57] ABSTRACT

A digital signal transmission channel degradation monitor for determining the error rate in a received data signal includes circuitry to generate an eye pattern signal for the received data signal which eye pattern signal is applied to a grid containing a number of cells defining regions in an ideal eye pattern. Each cell contains circuity to count the number of time an eye trace is located in that particular cell over a predetermined period of time. A number of cells within the ideal eye pattern area are grouped to define a predetermined pseudo error region. The number of times an eye trace enters into that error region over a predetermined time provides an indication of the generalized pseudo error rate for the transmission system. In addition, the number of times an eye trace is located in particular cells through the grid over a predetermined period of time can determine the type of stress that the transmission system is undergoing. This detector can be automated to determine both the error rate and type of stress for the data transmission system.

22 Claims, 8 Drawing Sheets

AUTOMATIC MONITORING OF DIGITAL COMMUNICATION CHANNEL CONDITIONS USINHG EYE PATTERNS

FIELD OF THE INVENTION

The present invention is directed to signal quality monitors for electronic digital transmission systems and in particular to channel quality monitors which can provide automatic detection and identification of degradations in digital communication channels.

BACKGROUND OF THE INVENTION

The goal of any communication system is to provide reliable service to the customer or end user. However, channels in electronic data transmission systems may become degraded due to stress on the system. In satellite communication (SATCOM) systems, for instance, stress can be imposed by transmitter/receiver degradations or failure and by out-of-tolerance conditions such as antenna pointing error, oscillator frequency drift, etc. Other types of stress may also be imposed on the system by precipitation occurring in a terrestrial microwave or satellite communication link, by interference from other sources, noise and items which may cause signal fading. The ultimate effect of communication stress is degraded signal quality or even complete outage. In a full duplex communication system employing digital data modulation (PSK or FSK), the quality or reliability of the system may be expressed in terms of an error rate which is the number of erroneously digital pulses received per unit of time.

The detection and identification of various functions of a communication system are usually performed independently by a collection of automated monitors which measure various signal parameters (signal level, noise power, transmitted power, etc.) along the signal path, as well as providing indications of the health of various subsystems. The signals from the monitors are compared against nominal values and stress is considered to be detected when a sufficient amount of degradation has occurred in one or more of the monitors. Several monitors are required to perform any effective stress detection since each monitor only responds to a subset of potential stresses. However, once communication stresses have been detected, a larger number of monitors is generally required to provide sufficient identification of the type of stresses present. Often, more than 10 different monitors may be required to reasonably identify the stresses common to a given link. Logic rules are then used to combine the indications given from each monitor in order to provide an estimate of the type of stress that the system is undergoing.

The Bit Error Rate (BER) is an absolute measure of a data channel's performance and automated BER monitors are available that can be used to detect the presence of communication stress. However, the time required to observe a single error is very long since a nominal BER may be as low as $10^{-12}$ bits per second. Furthermore, monitoring the BER directly provides no warning when slight degradations are taking place. Using BER monitors, communication system controllers can only become aware of any performance degradation after it already occurred, at which point the customers would have also detected it. Monitoring the BER, nevertheless, is still important since it represents the quality of the end product of any communication system.

A technique known as Pseudo Error Rate (PER) monitoring has been developed that provides earlier indications of degradations than a BER monitor. Several types of PER monitors are described in U.S. Pat. Nos. 4,188,615 and 4,034,340. PER monitors are now almost always included in the set of monitors used for detection and identification of stresses. The PER monitors overcome the long time intervals associated with BER monitors by making use of a second, parallel, receiver channel which is considerably degraded with respect to the main channel. Error rate estimates are, as a result, performed much quicker in the degraded channel due to the much larger number of errors occurring in that channel. However, that error rate is still indicative of degradations in the main channel since it is mathematically related to the actual error rate in the main channel. Therefore, the PER monitor can be considered as having a "gain" over a BER monitor since it amplifies the actual error rate and hence is much more responsive to slight changes in signal quality. Construction of a parallel receiver channel with a higher noise level than the main channel is, however, a rather expensive proposition.

Degraded parallel receiver channels can be simulated quite easily. Consider the well-known Eye Diagram, for instance, that is formed from the matched filtered outputs of a simple binary communication system. The signals are sampled at times equal to multiples of the symbol period T with positive values indicating the reception of one symbol while a negative sample indicates reception of the other symbol. The celebrated Eye Diagram results if the matched filtered outputs are collected over several symbol periods. The greater the eye opening is at the centre of the symbol period where samples are taken, the better the quality of the channel. An undistorted eye results for a no stress, noiseless case. However, the eye becomes distorted with the addition of noise and other communication stresses and, at the same time, the BER increases accordingly. Trained experts currently monitor links manually and rely heavily on Eye Pattern monitors which display the Eye Diagram on an oscilloscope. Although this type of monitor can provide much of the required accuracy, it has been mainly limited to manual observation and interpretation.

One way of simulating a degraded receiver channel was proposed in U.S. Pat. No. 3,721,959 by Robert A. George. The PER monitor disclosed in U.S. Pat. No. 3,721,959 counts the number of times an eye trace falls within the band around a symbol detection threshold, whereas a BER monitor counts the number of times an eye trace crosses that symbol threshold at the sampling instants over a given length of time. In other words, a BER monitor would detect when the eye is completely closed at the sampling instants whereas a PER monitor, as described in U.S. Pat. No. 3,721,959, would detect a partially closed eye at the sampling instants. This results in error rate amplification for that type of PER monitor.

There are a number of limitations with conventional automatic stress monitoring systems. First, the accuracy of current detection and identification monitoring systems needs to be considerably improved for satellite communication links. Greater error rate amplification is now required than PER monitors can currently provide for modern communication systems, which systems have an ever increasing complexity and bandwidth. In addition, the cost and complexity associated with multi-monitor systems may make it difficult to justify installing these monitors in small scale communication systems, especially if stress identification is required in addition to detection.

SUMMARY OF THE INVENTION

A digital signal transmission channel degradation monitor for determining communication stress in a digital transmission channel, according to one embodiment of the present invention, comprises a degradation detector having means for generating an eye pattern's analog signal for a received data signal and applying that eye pattern signal to a grid containing a number of cells, the cells being located within boundaries of an ideal eye pattern, a number of the cells being identified with a predetermined arbitrary generalized pseudo error region with all of the cells being formed by predetermined voltage amplitude levels within the ideal eye pattern's voltage level outermost extents and predetermined time periods within the ideal eye pattern's period, the detector further comprising means for determining when an eye trace of the generated eye pattern's analog signal is located within particular cells, means for obtaining the number of times an eye trace is in each cell of the grid during a predetermined period of time, the numbers from all cells being applied to a complex integrator which provides means for performing a weighted integration and transformation of said numbers to obtain a test statistic, means for comparing said test statistic with a predetermined threshold value and means for indicating a stress condition when said test statistic exceeds said predetermined threshold value during that predetermined period of time.

In further embodiments, the monitor also includes a degradation classifier to identify the types of degradation or stresses to which a channel is being subjected.

BRIEF DESCRIPTION OF THE DRAWINGS

The following detailed description of the invention will be more readily understood when considered in conjunction with the accompanying drawings, in which.

DESCRIPTION OF THE PREFERRED EMBODIMENTS

The eye pattern type of monitor has been used extensively to monitor communication systems. This type of monitor simultaneously displays the received signals from a number of signalling intervals on an oscilloscope. An indication of the presence of almost all types of faults can be obtained by properly interpreting the resulting waveform. The major shortcoming of this method lies in the fact that it has essentially been limited to a manual operation since a careful and detailed analysis of many features of the displayed waveform is required. Many other, nonmanual, types of monitors can be regarded as automated implementations of certain features of the eye pattern waveforms.

Figure 1A:
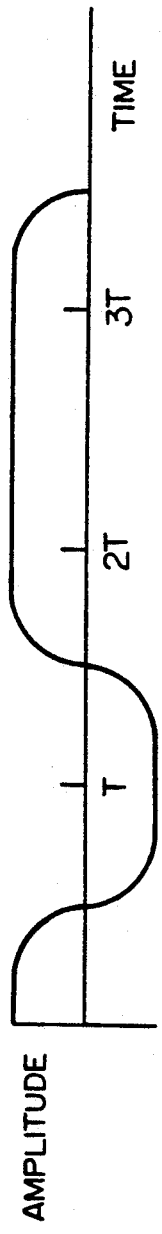
FIGS. 1a to 1d illustrate the formation of an Eye Diagram for a simple communication signalling scheme.
Figure 1B:
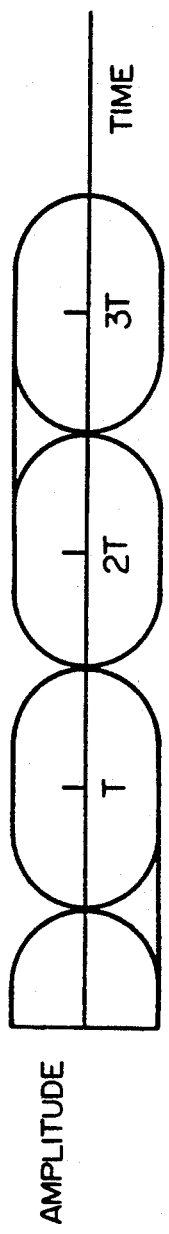
Figure 1C:
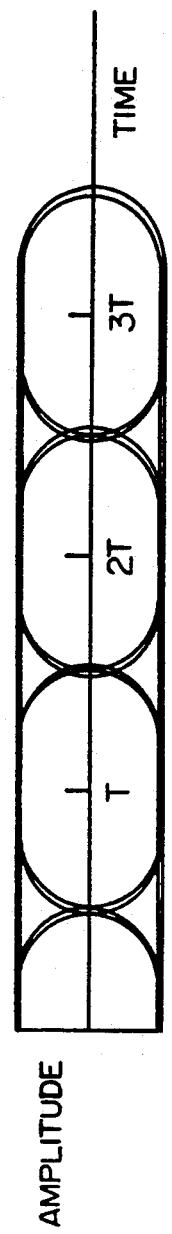
Figure 1D:
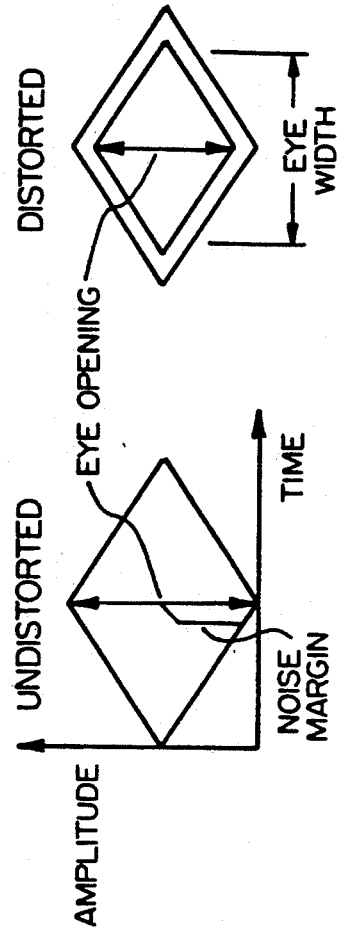
Figure 2A:
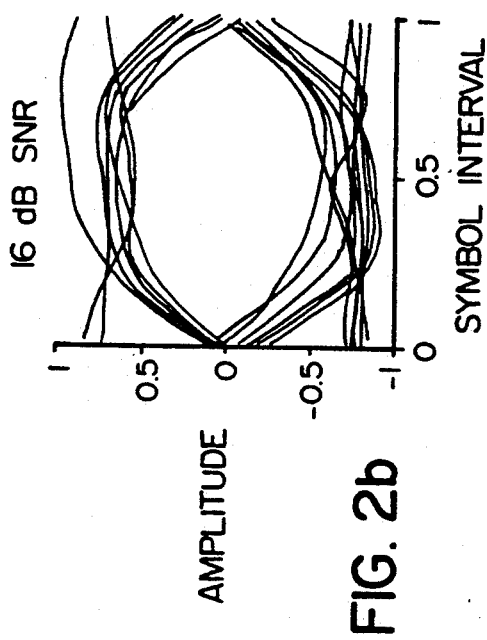
FIGS. 2a to 2d illustrate Eye Diagrams for four different types of operating conditions or stress.
Figure 2B:
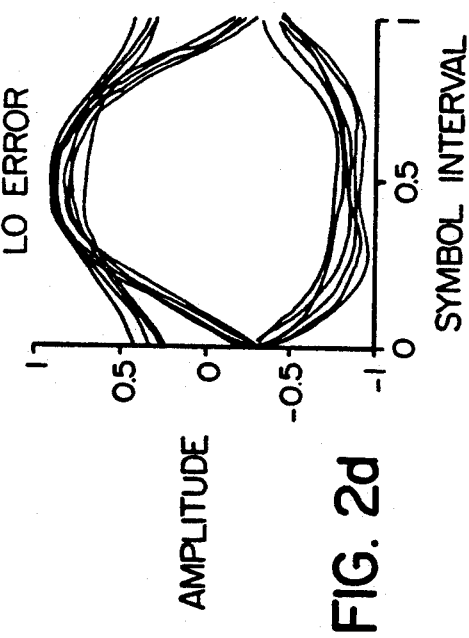
Figure 2C:
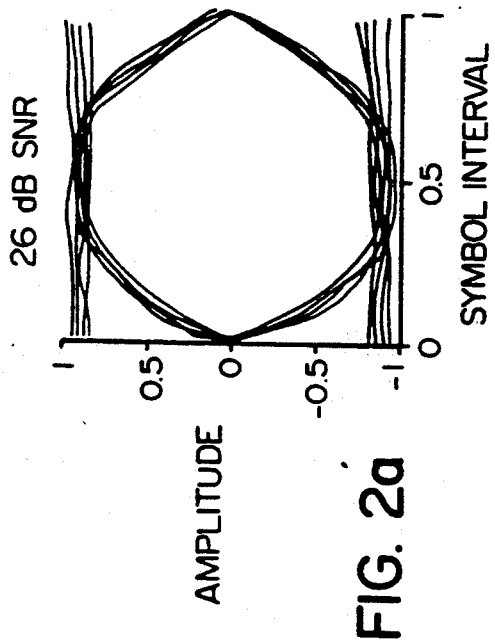
Figure 2D:
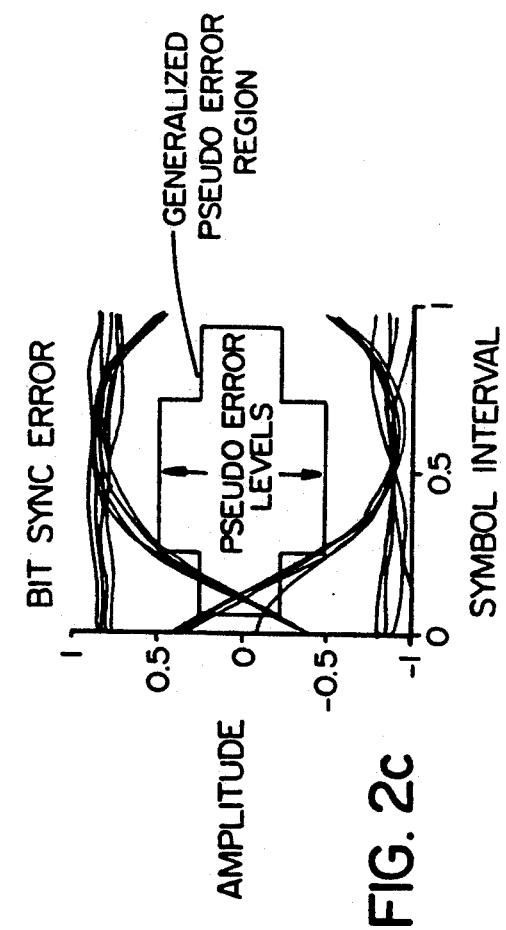

FIG. 1 illustrates the formation of a typical Eye Diagram for a simple communication signalling scheme showing in FIG. 1(d) an ideal Eye Diagram that would be obtained for an infinite signal-to-noise ratio (SNR) and a distorted Eye Diagram for a disturbed signal. Messages are decoded by sampling the matched-filtered signal in FIG. 1a at times equal to multiples of the symbol period T with positive values indicating the reception of one symbol and negative samples the reception of the other signal. Collecting and overlaying matched filtered output signals from successive symbol periods result in Eye diagrams as shown in FIG. 1(d) for both an undistorted and a distorted signal. The properties of the Eye Diagram provide an accurate means to identify and measure the amount and types of stress in a communication system. Consider the Eye Diagrams shown in FIG. 2, for instance, which Eye Diagrams were simulated for a noncoherent frequency shift keyed (NFSK) satellite communication system under four different types of stress conditions. The first case (a) shows a resulting Eye Diagram for a nominal 26 dB SNR operation while the second case (b) illustrates how the effects of a noise stress on the system deteriorates the Eye Diagram for a case under a degraded 16 dB SNR stressed condition. The third case (c) shows an Eye Diagram for a system subjected to a bit sync error stressed condition and the fourth case (d) illustrates an Eye Diagram for a case which is subjected to stress caused by a frequency drift in the transponder local oscillator (LO).

It is clear from FIG. 2 that the Eye Diagram can provide a very effective means for monitoring stresses but has had, up to now, a major shortcoming in that it has been mainly a manual operation. However, a new automated stress monitor according to the present invention and referred to as a Digital Eye Gridded Receiver with Arbitrary Degradation (DEGRAD) Monitor combines the performance of the Eye Pattern Monitor and the most general PER Monitor. This new DEGRAD Monitor automates monitoring of the Eye Diagram and provides a means to simulate any arbitrary degraded receiver providing a basis for any generalized pseudo error monitor. The error amplification improvement occurs because the simulated degraded receiver can be matched to any particular stress, or set of stresses, by defining a particular type of generalized pseudo error region across the entire symbol period. An arbitrary generalized pseudo error region is shown in FIG. 2c. The error amplification is obviously greater for the generalized pseudo error region, a cross shaped region in this example, than for a typical PER band at the optimum sampling instant ½ way across the symbol interval, the PER band having only upper and lower levels. No eye traces fall within the PER band shown in FIG. 2c but eye traces do fall within the cross shaped general pseudo error region.

Figure 3:
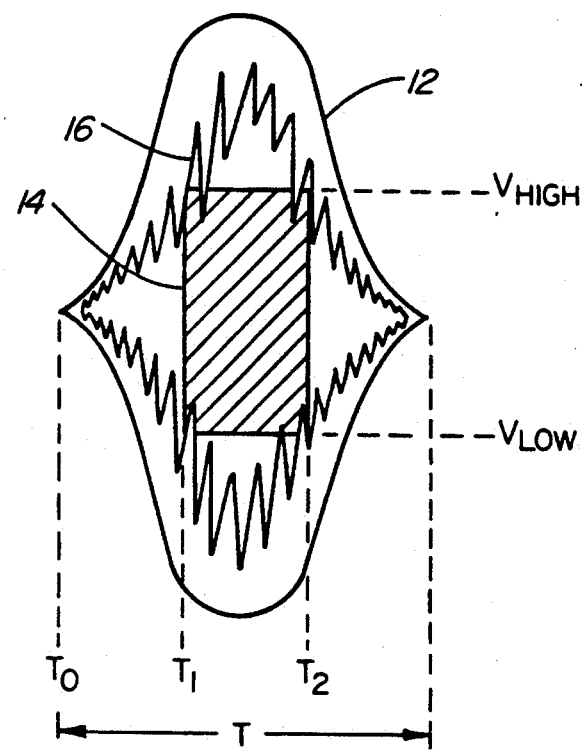
FIG. 3 is an Eye Diagram which illustrates a transmitted signal that is sufficiently attenuated, or contains noise, such that the signal transgresses into a forbidden zone or window as described in U.S. Pat. No. 3,721,959.

FIG. 3 illustrates the operation of a degradation detector of the type described in U.S. Pat. No. 3,721,959. Envelope 12 represents an ideal Eye Diagram, the eye pattern being an analog response resembling an eye as displayed on an oscilloscope in which the period T of the eye pattern corresponds to the time period of a digital pulse in a signal. When the pulse signal loses strength, through attenuation, the eye pattern tends to collapse towards 0 amplitude as illustrated at 16. Furthermore, if the received pulse signal contains a substantial amount of noise, this noise will be displayed on the eye pattern. The detector described in U.S. Pat. No. 3,721,959 defines a forbidden zone or window 14 within the eye pattern wherein the eye pattern signal 16 is deemed unreliable and in error if, for any reason, the signal transgresses within window 14. The window 14 is defined in height by a high voltage reference "$V_{high}$" and a low voltage reference "$V_{low}$" which establish the voltage excursion limits for an acceptable signal. The window 14 is further defined by the time period between a time $T_1$ and time $T_2$ which are related to the eye pattern crossover point time $T_0$ and the period T, whereby the window is centred within the eye pattern. In the case where the signal 16 transgresses into the forbidden region 14 due to attenuation of the signal, this transgression can be detected and an error signal generated. Similarly, an error signal can also be generated when the signal has been degraded by the presence of noise to the extent that the signal enters within the forbidden zone 14. This type of arrangement can be used to detect only certain types of errors because the forbidden region is restricted to be rectangular. Errors occurring near the centre of the symbol interval and those occurring near the edges of the symbol interval cannot, as a result, be detected reliably with the same forbidden region.

Figure 4:
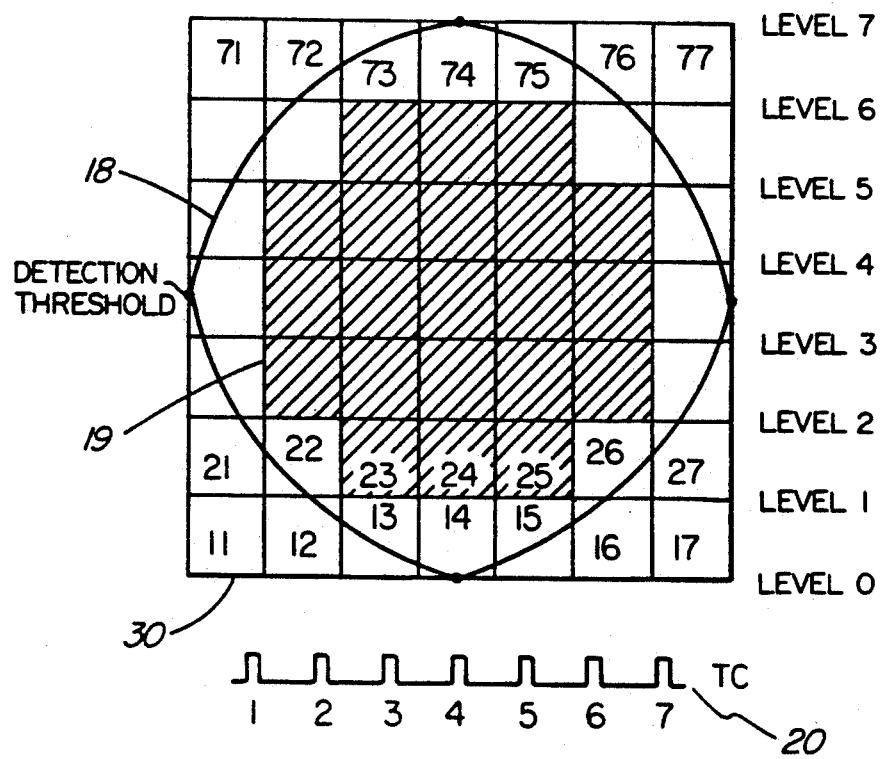
FIG. 4 shows an ideal Eye Diagram quantized into a grid of cells according to the present invention.
Figure 7:
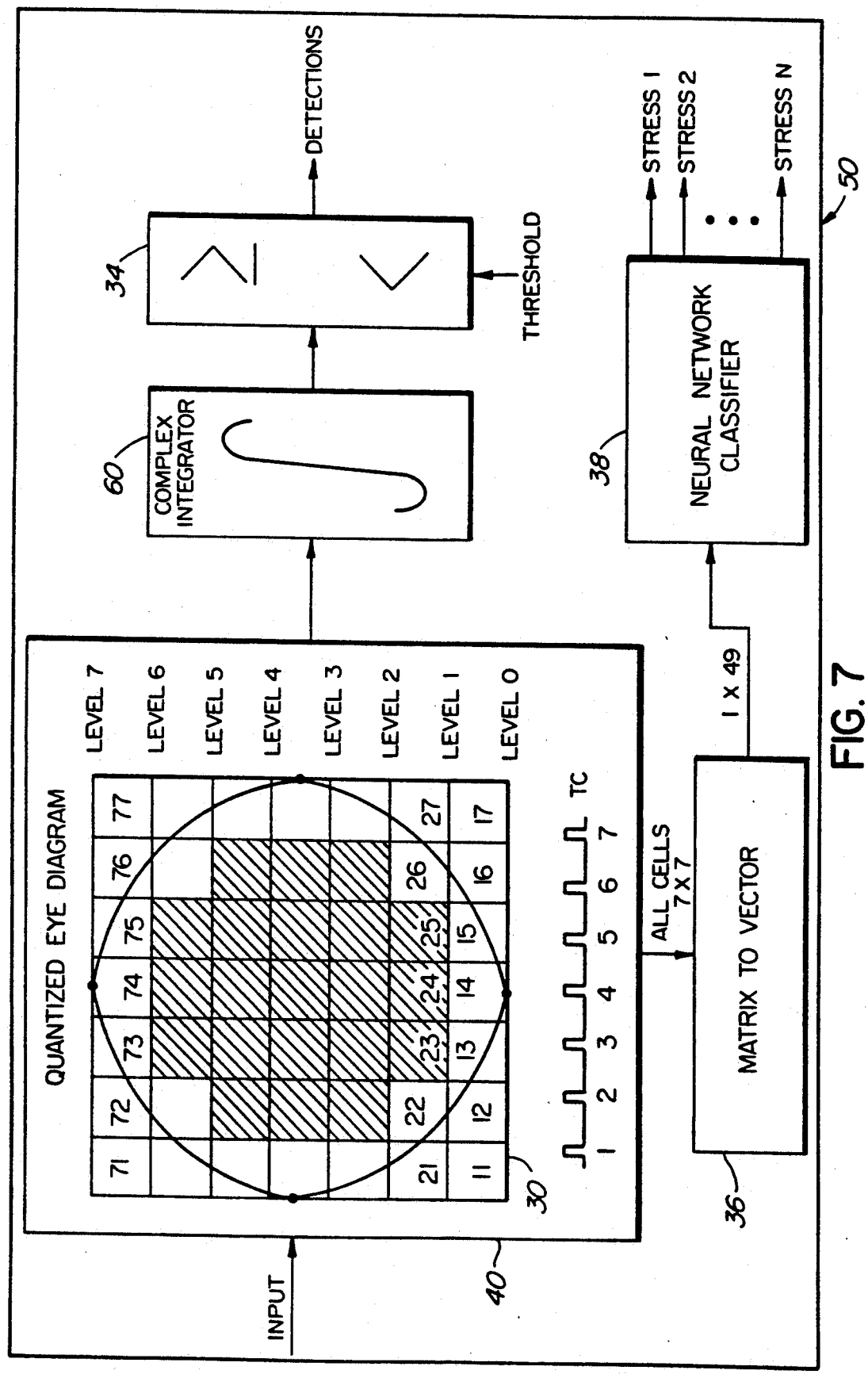
FIG. 7 shows a block diagram of the channel degradation monitor circuit according to the present invention which includes both stress detection and identification sections.

The DEGRAD Monitor 50 according to the present invention, which is shown in FIG. 7, can be used to automatically monitor a number of stress conditions reliably because it can incorporate any arbitrary generalized pseudo error of forbidden region. Its principal of operation is illustrated in FIG. 4 wherein the analog baseband filter outputs that form the Eye Diagram are overlaid onto a quantized grid 30 for an ideal eye pattern 18. FIG. 4 shows an ideal or general eye pattern 18 quantized onto a 7×7 grid 30, although any grid density could be used. A timing clock TC is used to define each horizontal increment in the grid while a set of voltage levels ("level 0" to "level 7" in this case) are used to define each vertical increment so that the timing clock and voltage levels will define each cell in the 7×7 grid. Each cell is identified as shown in FIG. 4 with cells 11 to 17 being defined by voltage levels between 0 and 1 and timing clock periods 1 to 7. Cells 71 to 77 are defined by voltage levels between 6 and 7 and timing clock periods 1 to 7. An arbitrary generalized pseudo error region within pattern 18 can be defined by using a number of cells to form that region, for instance cells 23 to 25, 32 to 36, 42 to 46, 52 to 56 and 63 to 65 as illustrated by cross-hatched lines at 19 in FIG. 4.

Figure 5A:
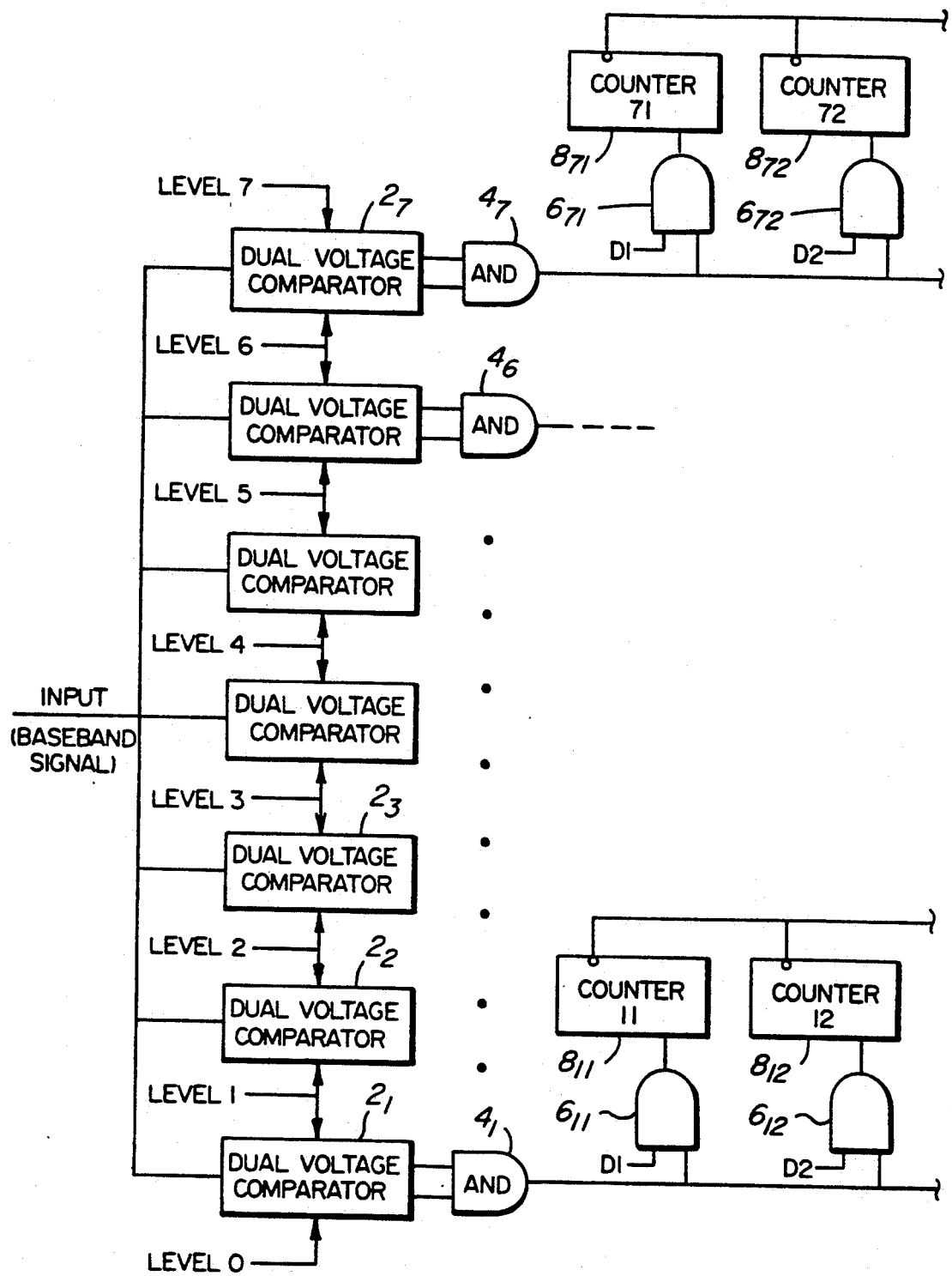
FIGS. 5a and 5b show a block diagram of a logic circuit for a monitor according to the present invention which circuit performs automatic formation of the Digital Eye Diagram.
Figure 5B:
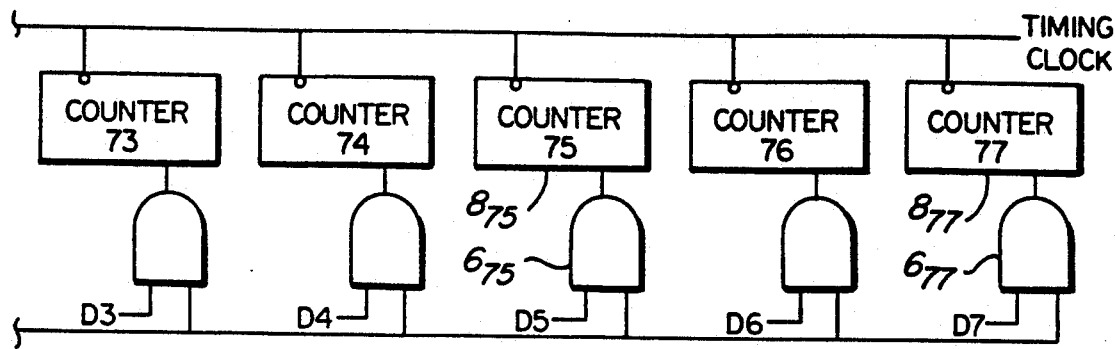
Figure 5B:
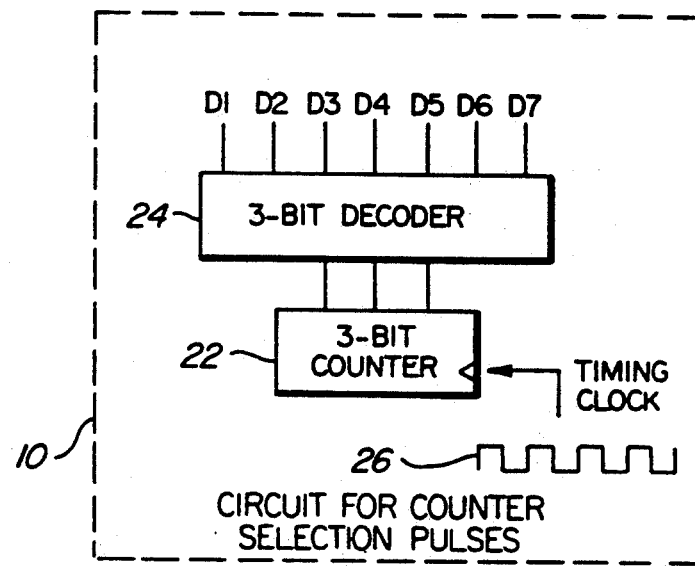
Figure 5B:
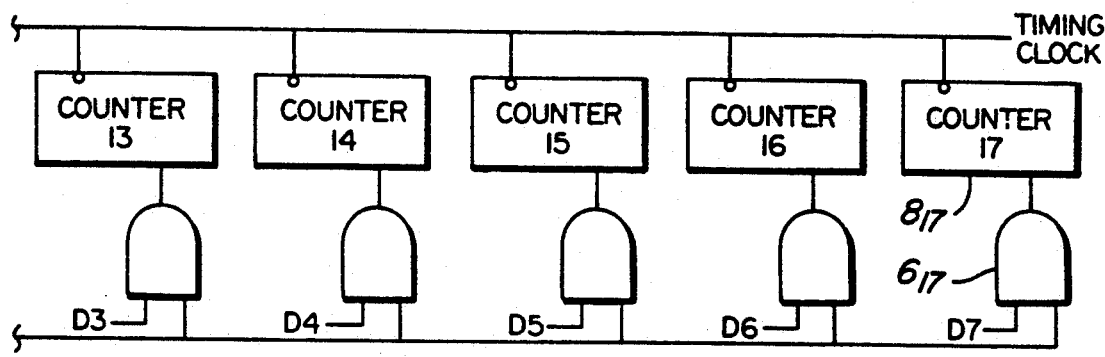
Figure 6A:
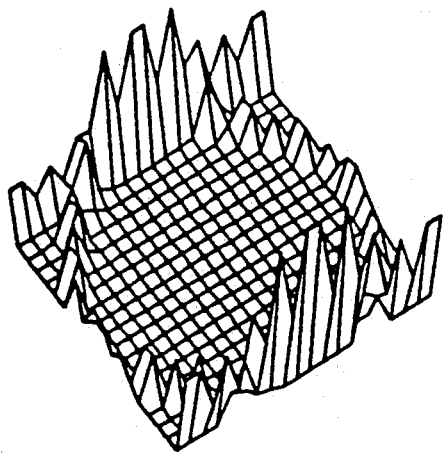
FIGS. 6a to 6d show examples of digitized eye diagrams for four different stress conditions.
Figure 6B:
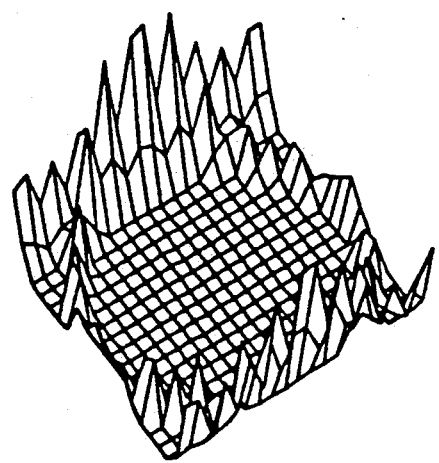
Figure 6C:
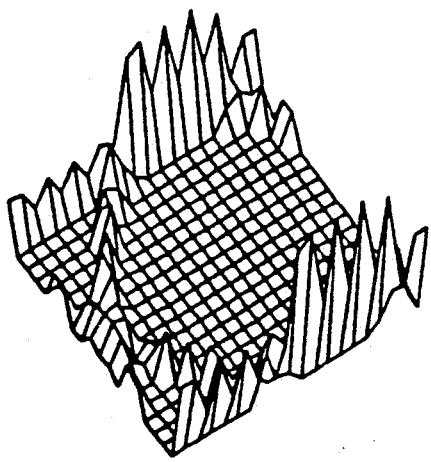
Figure 6D:
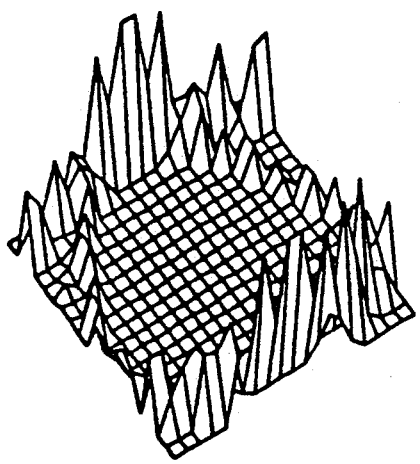

The intensity of an Eye Diagram in each cell (11, 12 ... 76, 77) can be represented by counters $8_{11}$, $8_{12}$, ... up to $8_{77}$ as shown in FIGS. 5a and 5b, or equivalently by any other means capable of integrating (e.g. charge on a capacitor). Each counter $8_{11}$, $8_{12}$, ... $8_{77}$ is connected to a corresponding AND gate $6_{11}$, $6_{12}$, ... $6_{77}$, each AND gate 6 ... having an input connected to one output $D_1$ to $D_7$ of decoder 24 which supply the AND gates with clock selection pulses. This selects which counter can be activated at any particular time as determined by clock 10. In other words, if a pulse is applied at $D_2$ to AND gate $6_{12}$ at the same time as a signal appears at the other input of AND gate $6_{12}$, then counter $8_{12}$ will be incremented. Similarly, each of the other counters will only be activated when a pulse ($D_1$ to $D_7$) appears at one input of a corresponding AND gate 6 ... at the same time as a signal appears at another input of that same AND gate. The decoder 24 is driven by the outputs of a 3-bit counter 22, in this instance, which in turn is triggered by the timing clock TC 26. The data input (baseband signal) signal is applied to seven Dual Voltage Comparators $2_1$, $2_2$, ... $2_7$. The Dual Voltage Comparators are supplied with reference voltages which are also applied to adjacent comparators, the reference voltages determining the amplitude of Level 0 to Level 7 as illustrated in FIG. 5a. Outputs from each comparator are then applied to an associated AND gate $4_1$ to $4_7$. These AND gates $4_1$ to $4_7$ will then apply a signal to a row of AND gates 6 ..., the row being determined by the input signal amplitude, which amplitude is at a value located between the values of two reference voltage levels. This will apply a signal to both inputs of an associated AND gate 4. In this manner, the counter for a particular cell 11, 12 ... 77 (FIG. 4) is activated each time the input baseband signal is at the particular amplitude (level) for that cell at the same time that the associated AND gates 6 ... receive a signal from clock 10.

FIGS. 5a and 5b show a block diagram of one circuit which can automate the Eye Diagram grid quantization procedure. This circuit uses flash converters which avoids the necessity of any analog-to-digital conversion. The analog baseband signal is presented to a set of dual voltage comparators $2_1$ to $2_7$ which control the cell rows (i.e. counters $8_{n1}$ to $8_{n7}$) that each eye trace overlays. The timing clock 10 is synchronized to the symbol period and controls the cell column (i.e. counters $8_{1n}$ to $8_{7n}$) that each trace overlays. The proper counters 8 ... are, as a result, incremented each symbol period in response to each of the eye traces.

In practice, all counters 8 ... are reset to zero and a predetermined number of eye traces (one per symbol) are quantized on the grid of counters. The count distribution across the grid is a digital representation of the corresponding Eye Diagram. This circuit operates in real time at a rate several times faster than the symbol rate, i.e. the clock rate for TC 26 is several times greater than the symbol rate. If this clock speed is too fast for implementation on a particular communication system, a separate bank of dual voltage comparators can be used for each column of counters in the quantization grid. The input signal would then be presented to each bank simultaneously. The banks would be then stepped through (enabled) one at a time in a staggered fashion by the clock pulses so that each bank would run only at the symbol rate.

In FIG. 6, examples of the quantized eye diagrams are shown resulting from the eye diagram quantization process defined by the present invention and corresponding to the four different stress types shown in FIG. 2. The counter value associated with a given cell is indicated by the height of the figure above the cell. In FIG. 6, a 20×20 quantization grid was used.

Automatic stress detection and identification can be accomplished as illustrated in FIG. 7 once the Eye Diagram is automated as shown in FIGS. 5a and 5b. Each time an eye trace appears in one or more of the cells in the quantization grid 30 defined in FIG. 7, the corresponding counter value is incremented. Detections are made by processing the resulting counter values using a complex integration at 60. After a predetermined period of time for the digital eye diagram to form and for the integration to accumulate, the output of the integration is compared to a present threshold in Threshold Detector 34 which causes an indicator, or alarm, to be activated when a predetermined threshold is exceeded.

The outputs of the cell counters are passed to a Complex Integrator Circuit 60 as shown in FIG. 7 and FIG. 8. In the general case, the input enters the Complex Integrator 60 and is first processed by a Weighted Summation unit 61 as illustrated in FIG. 8a. Each counter value is weighted and the weighted values are then added together, the weights are selected reflecting the predetermined generalized pseudo error region. The output of the Weighted Summation unit 61 enters two parallel paths, one of which is delayed by a Delay unit 62 which provides a delay equal to the symbol period T, the delayed output being then passed to a Scalar Multiplier 63 with scalar value $\alpha_1$. The undelayed parallel path originating at the output of the Weighted Summation unit 61 is simply multiplied by a scalar $\alpha_2$ by the Scalar Multiplier unit 64 and is then added to the output of Scalar Multiplier 63 by the Summer 65. The Summer 65 output is then passed through a Transformation unit 66 and is finally accumulated in an Accumulator 67. The accumulator output is compared to a predetermined threshold in a Threshold Detector 34 as shown in FIG. 7. A stress detection is registered when the preset threshold is exceeded by the output of Accumulator 67. The Complex Integrator 60 is operated each time a new eye pattern trace is presented to the quantization grid 30, and hence runs in real time at the symbol rate. After a predetermined period of time required for a digital eye diagram to build up, the Accumulator 67 output is compared to the predetermined threshold.

The Complex Integrator 60 is a general detection processor that operates on the counter outputs in the quantization grid 30. Two special cases of the Complex Integrator 60 are of interest. The first case is shown by the Complex Integrator 70 in FIG. 8b. The counter weights associated with the Weighted Summation unit 71 are set to zero for counters not identified with the predetermined generalized pseudo error region and to one for counters that are identified with the predetermined generalized pseudo error region, causing the output of the Weighted Summation unit 71 to correspond to the summation of the counter values identified with the predetermined generalized pseudo error region. The scalars $\alpha_1$ and 60 $_2$ associated with Scalar Multiplier 73 and Scalar Multiplier 74 are set to $-1$ and 1, respectively. Thus, the output of the Summer 75 represents the number of those cells identified with the generalized pseudo error region that were transgressed by the current eye pattern trace. By passing the Summer 75 output through a 1-bit quantizer Transformation unit 76 with a threshold at zero, the Accumulator 77 is incremented by one only when the current eye pattern trace transgresses the predetermined generalized pseudo error region.

Figure 8A:
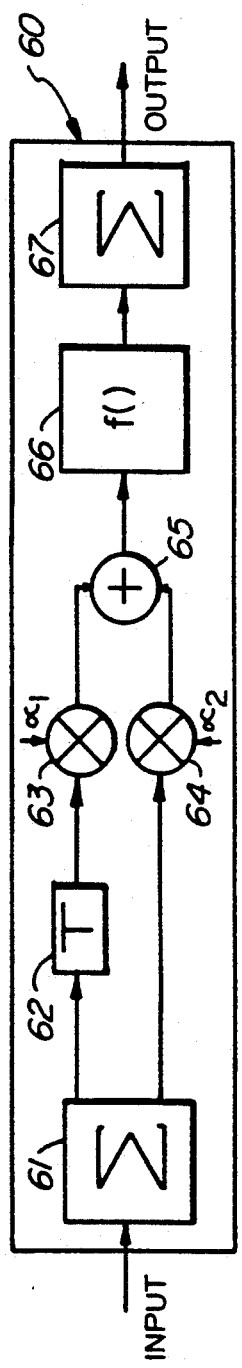
FIGS. 8a to 8d show a detailed circuit of the Complex Integrator in FIG. 7 along with three specific implementations.
Figure 8B:
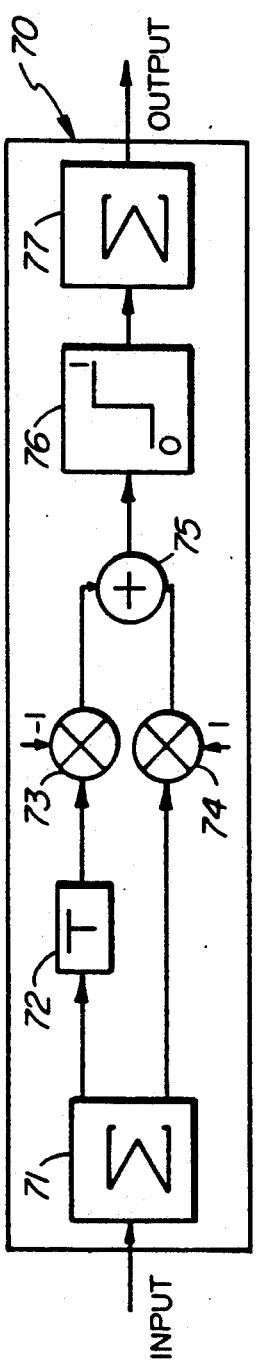
Figure 8C:
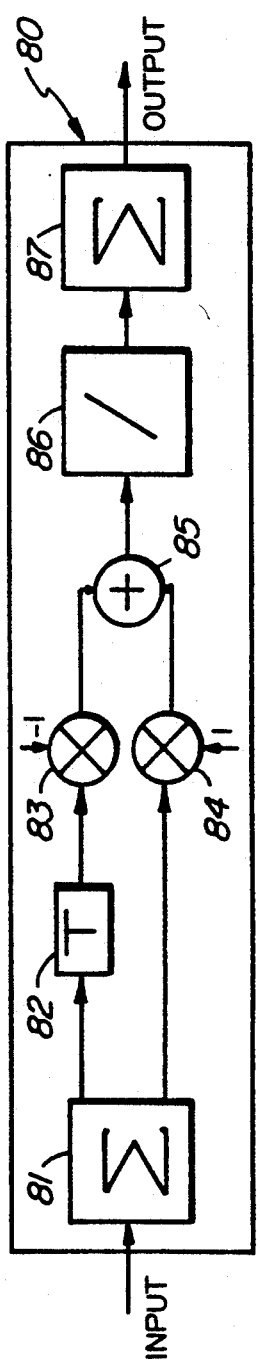
Figure 8D:
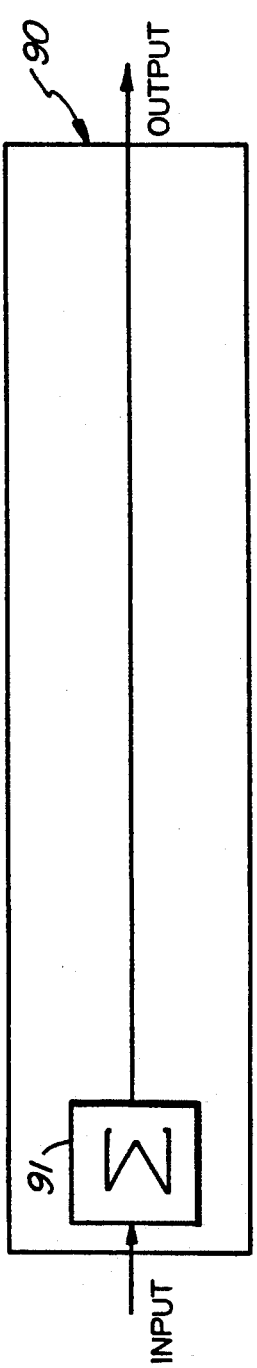

The second special case of the Complex Integrator 60 considered is shown in FIG. 8c and is identical to the realization just described in FIG. 8b, only that the 1-bit quantizer Transformation unit 76 is replaced by a linear Transformation unit 86 with unity gain, as shown in FIG. 8c. Therefore, each time an eye pattern trace is presented to the quantization grid 30, the Accumulator 87 is incremented by the number of cells identified with the predetermined generalized pseudo error region transgressed by said eye pattern trace. Specific realizations of the Complex Integrator 60 can result in significant simplifications but are still within the spirit and scope of the Complex Integrator 60 described in this invention. For example, the special instance of the Complex Integrator 80 shown in FIG. 8c can be simplified to a Complex Integrator 90 as shown in FIG. 8d that consists of a simple Summation unit 91 that sums the counter values identified with the predetermined generalized pseudo error region to arrive at a test statistic. In this case, the Summation unit 91 is activated only after a predetermined period of time required for the digital eye diagram to build up. Hence, the Summation unit 91 is operated just once during each predetermined period of time, unlike the general case of the Complex Integrator 60 that is run at the symbol rate.

Stress identification is carried out in a parallel circuit to the detection operation which was described above. The entire array of counter values are passed onto an expert system, such as a neural network, for identification in that parallel circuit. Neural networks are particularly well suited to this task since they are quite good at performing pattern recognition tasks. FIG. 7 shows one type of system for stress identification in which the counter values of all cells of the quantized eye diagram 30 are converted into a single vector by a matrix-to-vector operation in Converter 36 with the resulting vector being passed to a Neural Network 38 where it is classified into one of N different types of stress classes. The Converter 36 and Neural Network 38 form a Degradation Classifier. First the number of times an eye trace is in each cell on the grid during a predetermined period of time is obtained and the intensity distribution of a digital eye diagram during that predetermined period of time is collectively represented. The Matrix-to-Vector Converter 36 then transforms the digital eye diagram into a vector form and applies it to Neural Network 38 which determines, from a number of predefined stress conditions, what type of stress conditions are present.

The DEGRAD Monitor according to present invention is ideally suited for both stress detection and stress identification. Furthermore, since it is a single monitor, it reduces costs for an automatic stress monitoring system significantly compared to systems which require a number of monitors. It offers detection performance that is superior to PER detectors while maintaining all of the benefits of the celebrated Eye-Diagram. Various modifications may be made to the preferred embodiments without departing from the spirit and scope of the invention as defined in the appended claims.

We claim:

1. A digital signal transmission channel monitor for determining in real-time degradation in transmission quality created by stress in a digital transmission system, comprising, a degradation detector having means for generating an eye pattern's analog signal for a received data signal and applying that eye pattern signal to a grid containing a number of cells, the cells being located within boundaries of an undistorted eye pattern having maximum and minimum voltage amplitude values and a time period T, a number of the cells being identified with a predetermined, generalized error region with all of the cells being formed by predetermined voltage amplitude levels located between the maximum and minimum voltage amplitude values and by predetermined time periods within said time period T, the detector further comprising means for determining when an eye trace of the generated eye pattern's analog signal is located within particular cells, means for obtaining the number of times an eye trace is in each cell of the grid during a predetermined period of time, the numbers from all cells being applied to a complex integrator containing a weighted summer having predetermined weights for each cell and which provides means for performing a weighted integration of said numbers, the complex integrator having means for transforming said weighted integration to obtain a test statistic, said detector having means for comparing said test statistic with a predetermined threshold value and means for indicating a stress condition when said test statistic exceeds said predetermined threshold value during said predetermined period of time.

2. A digital signal transmission channel monitor as defined in claim 1, wherein each cell of the grid is defined by a predetermined high and a predetermined low voltage level forming rows of cells, the cells being further defined by time periods shorter than the eye pattern's time period T, the time periods forming columns of cells within the eye pattern's time period T with time boundaries of the cells in any one column being determined by a clock which is synchronized with the eye pattern's period T.

3. A digital signal transmission channel monitor as defined in claim 2, wherein a voltage amplitude of the eye pattern's analog signal at any given sampling time determines the row of cells that signal is located in at said sampling time and said sampling time determines the column of cells within which said analog signal is located to determine, at any instant, which cell the eye pattern signal is identified with.

4. A digital signal transmission channel degradation monitor as defined in claim 3, wherein an integration means is associated with each one of the cells which provides a total for the number of times an eye trace falls within that particular cell during said predetermined period of time.

5. A digital signal transmission channel monitor as defined in claim 4, wherein said integration means is a counter which is incremented each time an eye trace is located within an associated cell during said predetermined period of time, an AND gate being associated with each counter having one input connected to an output of the clock wherein the clock determines which AND gate and associated counter is activated at any particular instant of time.

6. A digital signal transmission channel monitor as defined in claim 5, wherein each AND gate's other input is connected to a circuit which supplies an activating signal only when the voltage amplitude of the eye pattern analog signal is within a predetermined voltage range, a particular counter being incremented only when both inputs to an AND gate associated with that particular counter are activated at the same time.

7. A digital signal transmission channel monitor as defined in claim 6, wherein said circuit has an input connected to the eye pattern's analog signal which signal is applied to an input of a number of identical dual voltage comparators, each dual voltage comparator being associated with a row of counters and being supplied with the predetermined high and predetermined low reference voltages associated with that row of counters, each comparator having means to determine if the eye pattern's analog signal applied to its input is between said predetermined high and predetermined low reference voltages for the purpose of selecting a row of cells to be associated with said eye pattern's analog signal at any given time.

8. A digital signal transmission channel monitor as defined in claim 7, wherein each dual voltage comparator has two outputs connected to inputs of an associated AND gate whose output is connected to said other inputs of all of the AND gates associated with the counters in the row of counters which are associated with that particular dual voltage comparator.

9. A digital signal transmission channel monitor as defined in claim 8, wherein outputs of counters associated with cells identified with said error region are connected to said summer in the complex integrator to provide a total number of counts from counters which were incremented in said error region during said predetermined period of time.

10. A digital signal transmission channel monitor as defined in claim 9, wherein an output from the summer is applied to a threshold circuit connected to the summer, the threshold circuit being connected to a stress indicator to which the threshold circuit applies a signal when the summer's output exceeds a predetermined threshold value within said predetermined period of time.

11. A digital signal transmission channel monitor as defined in claim 10 which includes a degradation classifier that provides means for identifying types of stress observed in a digital transmission channel, the degradation classifier comprising means for collectively representing an intensity distribution of the eye pattern signal during the predetermined period of time including means for transforming said intensity distribution into a vector form, means for determining which of a predefined number of stress conditions said intensity distribution most closely resembles from said vector form and for indicating selected stress conditions.

12. A digital signal transmission channel monitor as defined in claim 11, wherein the means for transforming said intensity distribution into a vector form is a matrix-to-vector converter to which outputs from all the counters are applied, the converter's output being applied to a neural network classifier which provides a means for determining which of a predefined number of stress conditions exist.

13. A digital signal transmission channel monitor as defined in claim 5 which includes a degradation classifier that provides means for identifying types of stress observed in a digital transmission channel, the degradation classifier comprising means for collectively representing an intensity distribution of the eye pattern signal during the predetermined period of time including means for transforming said intensity distribution into a vector form, means for determining which of a predefined number of stress conditions said intensity distribution most closely resembles from said vector form and for indicating selected stress conditions.

14. A digital signal transmission channel monitor as defined in claim 1 which includes a degradation classifier that provides means for identifying types of stress observed in a digital transmission channel, the degradation classifier comprising means for collectively representing an intensity distribution of the eye pattern signal during the predetermined period of time including means for transforming said intensity distribution into a vector form, means for determining which of a predefined number of stress conditions said intensity distribution most closely resembles from said vector form and for indicating selected stress conditions.

15. A digital signal transmission channel monitor as defined in claim 13, wherein the means for transforming said intensity distribution into a vector form is a matrix-to-vector converter to which outputs from all the counters are applied, the converter's output being applied to a neural network classifier which provides a means for determining which of a predefined number of stress conditions exist.

16. A digital signal transmission channel monitor as defined in claim 8, wherein said weighted summer has means to perform a weighted summation of all counter outputs, the weighted summer having predetermined weights for cells within said error region and predetermined weights for cells outside of said error region, the weighted summer having two parallel outputs, one of which is applied to a delay means having a delay equal to the eye pattern's time period, said delay means output being applied to a multiplier that multiples that output by a scalar $\alpha_1$, a second output of the weighted summer being applied directly to a multiplier that multiplies said second output by a scalar $\alpha_2$, outputs of both multipliers being added together in an adder and their sum applied to a transformation means capable of applying an arbitrary but predetermined transformation to said sum, the transformation means output being applied to an accumulation mean which accumulates said transformation means output each symbol period during said predetermined period of time, the accumulator's output being the test statistic for that predetermined period of time.

17. A digital signal transmission channel monitor as defined in claim 16, wherein the said means for comparing and said means for indicating a stress condition consists of the test statistic from the complex integrator being applied to a threshold circuit connected to the complex integrator, the threshold circuit being connected to a stress indicator to which the threshold circuit applies a signal when said test statistic exceeds a predetermined threshold value within said predetermined period of time.

18. A digital signal transmission channel monitor as defined in claim 17, wherein all counter outputs are connected to a degradation classifier in a circuit parallel to the complex integrator, the degradation classifier determining the type of stress to which the transmitted data signal is being subjected by analyzing outputs from all of the counters.

19. A digital signal transmission channel monitor as defined in claim 18, wherein the degradation classifier comprises a matrix-to-vector converter to which all outputs from the counters are applied, a vector output from the converter being connected to a neural network classifier which determines, from that vector, the types of stress to which the transmitted data signal is being subjected.

20. A digital signal transmission channel monitor as defined in claim 19, wherein the predetermined weights associated with the weighted summer are set to zero for all cells outside of said error region and are set to one for all cells that are identified with said error region, with the multiple scalars $\alpha_1$ and $\alpha_2$ being set to $-1$ and 1, respectively.

21. A digital signal transmission channel monitor as defined in claim 20, wherein the transformation means is a 1-bit quantizer such that it outputs a logical 1 value whenever its input is greater than zero and inputs a logical 0 value otherwise.

22. A digital signal transmission channel monitor as defined in claim 20, wherein the transformation means is a linear transformation with unity gain such that it outputs the same value that is present at its input.

* * * * *